(12) United States Patent
Wirth et al.

(10) Patent No.: US 7,803,327 B2
(45) Date of Patent: Sep. 28, 2010

(54) EXHAUST GAS TREATMENT DEVICE AND THE RESPECTIVE MANUFACTURING PROCESS

(75) Inventors: Georg Wirth, Kirchheim/Teck (DE); Marco Wenz, Esslingen (DE); Peter Zacke, Albershausen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 1125 days.

(21) Appl. No.: 11/478,848

(22) Filed: Jun. 30, 2006

(65) Prior Publication Data
US 2007/0009402 A1 Jan. 11, 2007

(30) Foreign Application Priority Data
Jul. 5, 2005 (DE) .................. 10 2005 031 677

(51) Int. Cl.
*B01D 50/00* (2006.01)
(52) U.S. Cl. ..................................................... 422/179
(58) Field of Classification Search ................. 422/168, 422/179, 180; 29/890
See application file for complete search history.

(56) References Cited

U.S. PATENT DOCUMENTS

| 5,555,621 A | * | 9/1996 | Tanabe et al. ................. 29/890 |
| 2002/0127154 A1 | | 9/2002 | Foster et al. |

FOREIGN PATENT DOCUMENTS

| DE | 195 05 030 A1 | 8/1996 |
| DE | 198 03 063 A1 | 7/1999 |

OTHER PUBLICATIONS

First Office Action for related Chinese Application No. 2006101013555, dated Mar. 20, 2009.

\* cited by examiner

*Primary Examiner*—Tom Duong
(74) *Attorney, Agent, or Firm*—Howard IP Law Group, PC

(57) ABSTRACT

An exhaust gas treatment device for an exhaust gas system of an internal combustion engine, in particular of a motor vehicle, includes a housing and at least one exhaust gas treatment insert arranged in the housing and sheathed by bearing material on the circumference. To improve the axial fixation of the position of the exhaust gas treatment insert in the housing, at least one frictional structure is provided between the bearing material and the housing.

15 Claims, 5 Drawing Sheets

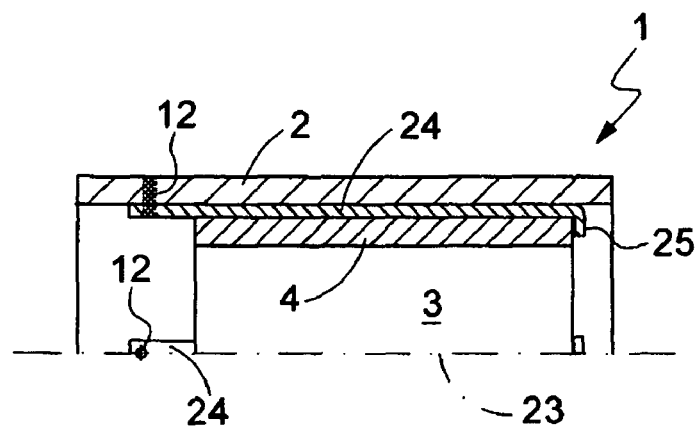
Fig. 14
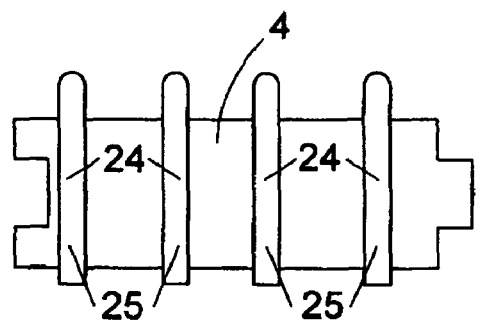
Fig. 15
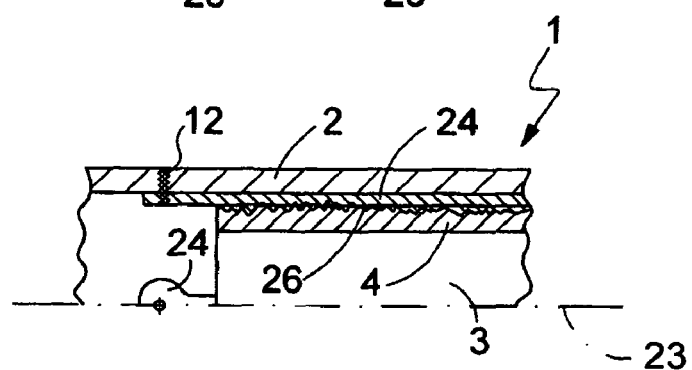
Fig. 16
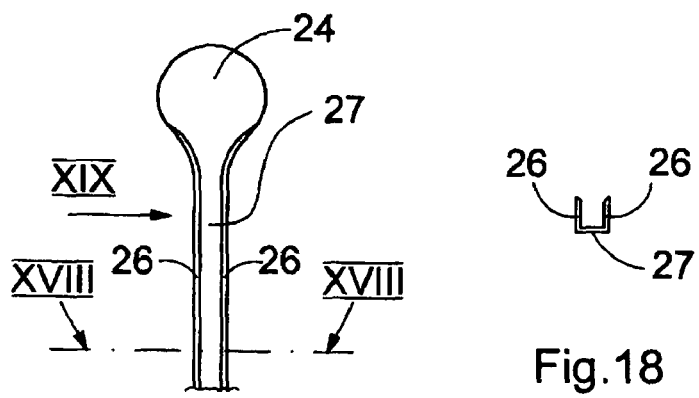
Fig. 17
Fig. 18
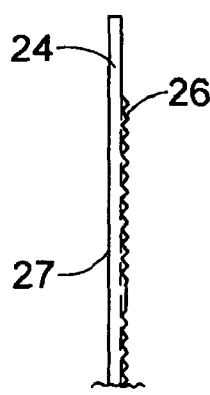
Fig. 19

EXHAUST GAS TREATMENT DEVICE AND THE RESPECTIVE MANUFACTURING PROCESS

FIELD OF THE INVENTION

The present invention relates to an exhaust gas treatment device for an exhaust system of an internal combustion engine, such as a motor vehicle. The invention also relates to a method for manufacturing such an exhaust gas treatment device.

BACKGROUND OF THE INVENTION

An exhaust gas treatment device such as a catalytic converter or a particulate filter usually includes a housing and at least one exhaust gas treatment insert arranged therein, preferably a catalytic converter element or a particulate filter element. For storing the respective insert in the housing, the insert is sheathed on its circumference by a bearing material, preferably designed as a bearing mat. In the case of ceramic inserts in particular, e.g., in the form of monoliths, such bearing materials are at the same time used to secure the respective insert axially in the housing, preferably made of metal. To this end, the bearing material is put under radial tension in the installed state. At the same time, manufacturing tolerances can be compensated in this way.

However, it has been found that over a period of time, the bearing material undergoes changes due to operation of the internal combustion engine and/or the exhaust system. The radial prestress may be reduced due to this change or aging. The strength of the axial position fixation between the exhaust gas treatment insert and the housing is thereby reduced, resulting in the risk that the respective insert may be misaligned in relation to the housing due to the effects of flow resistance and inertial forces occurring operation. This can lead to the destruction of the insert, which may then result in damage to the exhaust gas treatment device and the entire exhaust system.

SUMMARY OF THE INVENTION

The present invention relates at least to the problem of providing an improved embodiment for an exhaust gas treatment device of the type defined in the introduction, this embodiment being characterized in particular by an improved axial fixation of the respective exhaust gas treatment insert.

In a first solution to the problem, an embodiment of the present invention is based on the general idea of increasing the friction between the bearing material of the particular exhaust gas treatment insert and the housing. This may be accomplished by providing at least one frictional structure between the bearing material and the housing.

An embodiment of the present invention is utilizing here the finding that with a traditional exhaust gas treatment device, the adhesive friction between the bearing material and the housing is the weakest link in the axial fixation achieved between the respective exhaust gas treatment insert and the housing through radial tension on the bearing material. The relatively low coefficient of friction which usually prevails between the bearing material and the housing is lower, at least in the case of a metallic housing and a ceramic exhaust gas treatment insert, than the coefficient of friction between the bearing material and the exhaust gas treatment insert. Since the adhesive friction is a function of the coefficient of friction, the contact surface and the normal force, with an increase in axial load and/or with a decrease in radial tension of the bearing material, i.e., with a decrease in the normal force, the adhesion between the bearing material and the housing first declines and the at least one exhaust gas treatment insert sheathed with the bearing material begins to move in relation to the housing.

Due to the frictional structure between the bearing material and the housing as proposed according to an embodiment of this invention, the coefficient of friction between the bearing material and the housing can be increased significantly, which improves the adhesion between the bearing material and the housing accordingly.

It is fundamentally possible to design the frictional structure integrally on the inside of the housing facing the bearing material, e.g., through a suitable roughening of the inside. Additionally or alternatively, the frictional structure can also be implemented by friction inserts in the form of separate components which are inserted between the bearing material and the housing. Additional machining on the inside of the housing may be relatively complex and expensive. In contrast with that, additional friction inserts can be manufactured relatively inexpensively and installed with little effort.

For the embodiment of the friction inserts, there are more or less any desired possibilities. For example, a type of double-sided abrasive film is conceivable; likewise, metal strips having roughened surfaces accordingly are also conceivable. According to an inexpensive variant that is easy to produce, the respective frictional insert may be formed by a ribbed expanded metal which automatically has a sharp-edged rhomboidal structure due to its manufacturing process.

In a second approach to solving the problem, an embodiment of the present invention is based on the general idea of introducing at least one fixation insert between the bearing material of the respective exhaust gas treatment insert and the housing that will secure the bearing material on the one hand while on the other hand securing the respective fixation insert on the housing. Due to the use of such fixation inserts, suitable fastening techniques may be used to secure the bearing material on the respective fixation insert at least in the axial direction on the one hand while on the other hand attaching the respective fixation insert to the housing. Then the friction between the bearing material and the housing and/or between the fixation insert and the bearing material on the one hand and the fixation insert and the housing on the other hand is no longer relevant. This approach may be advantageous for certain applications.

BRIEF DESCRIPTION OF THE DRAWINGS

It is self-evident that the aforementioned features and those yet to be explained below can be used not only in the particular combination given but also in other combinations or they may be used alone without going beyond the scope of the present invention.

Exemplary embodiments of the present invention are depicted in the drawings and explained in greater detail in the following description, where the same reference numerals are used to refer to the same or similar or functionally similar components.

The figures show, each in schematic drawings:

Figure 1:
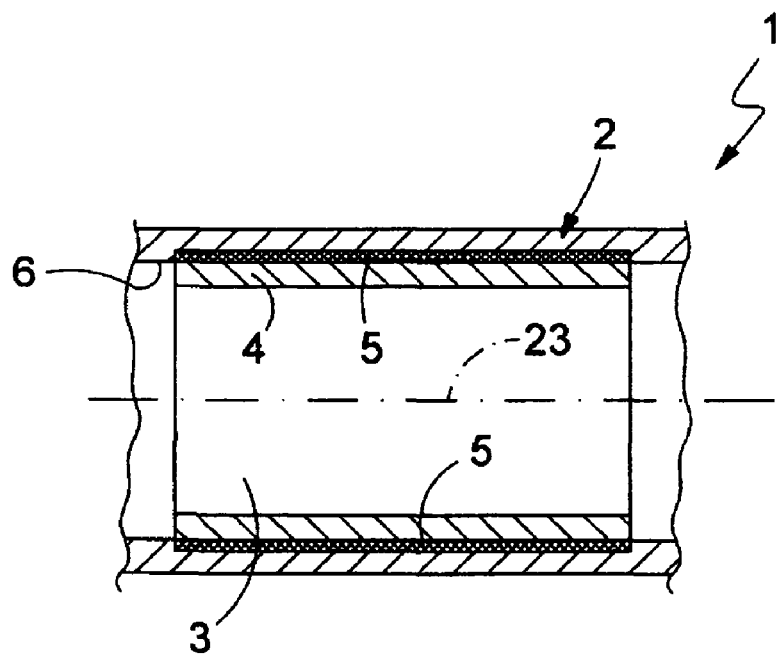
Figure 2:
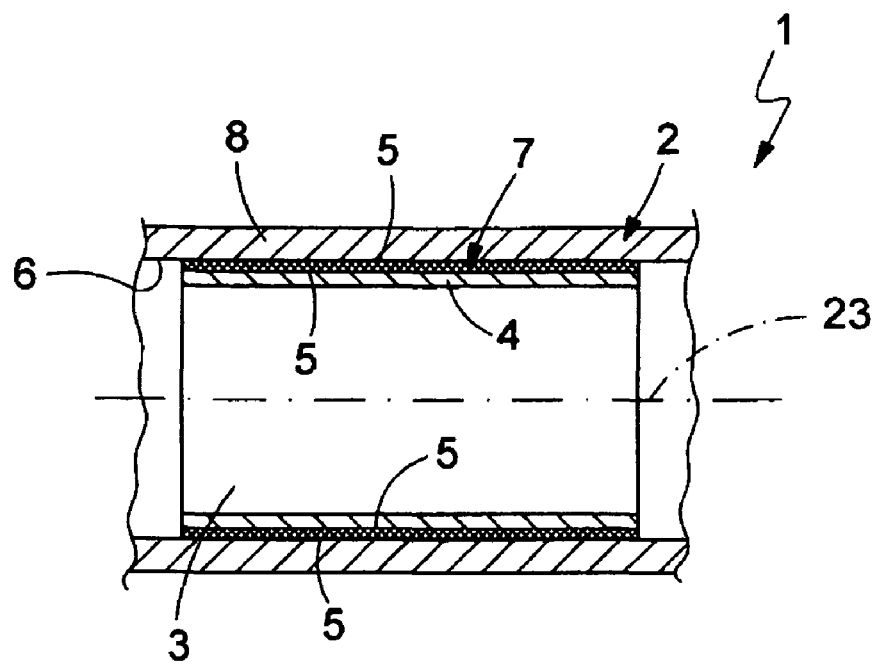
Figure 3:
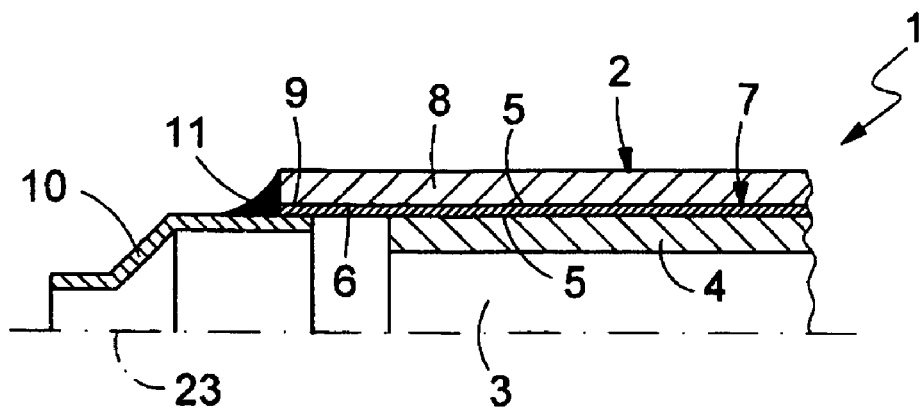
Figure 4:
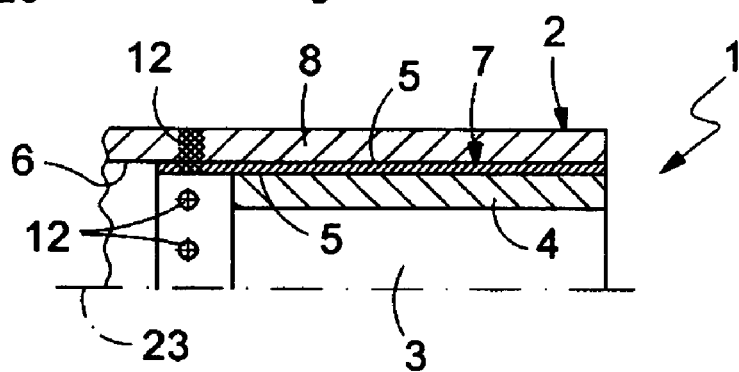
Figure 5:
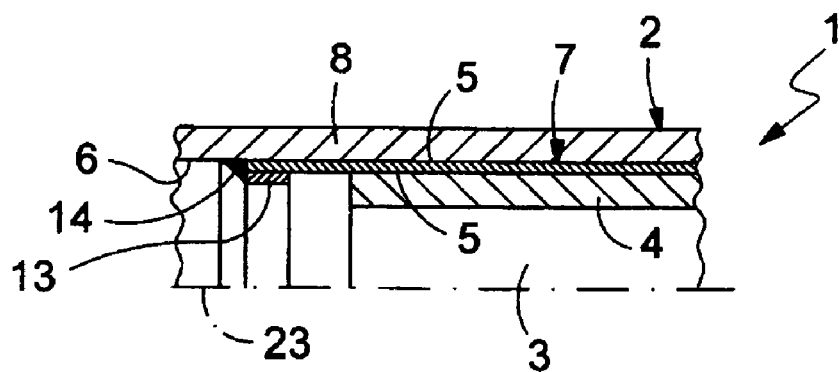
Figure 6:
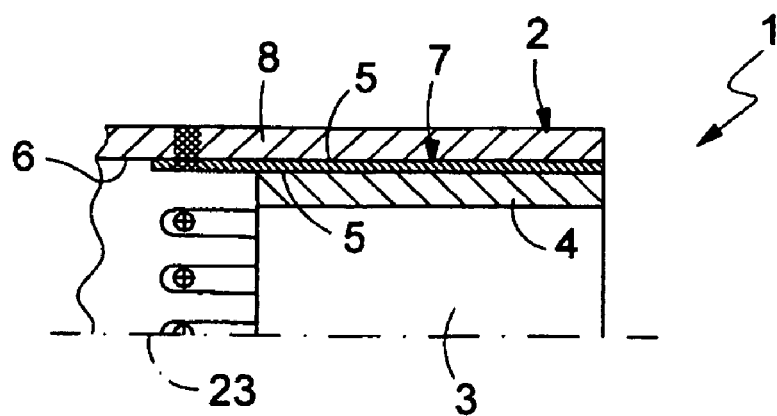
Figure 7:
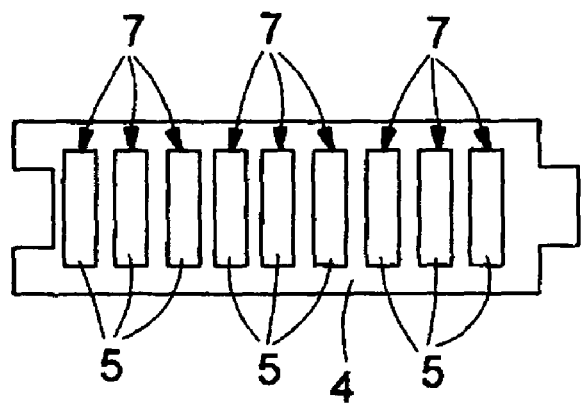
Figure 8:
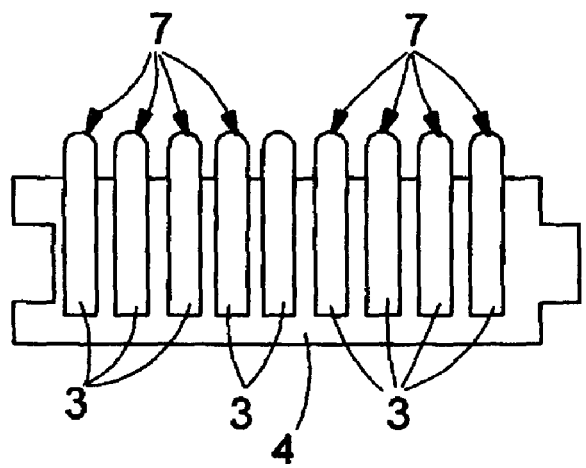
Figure 9:
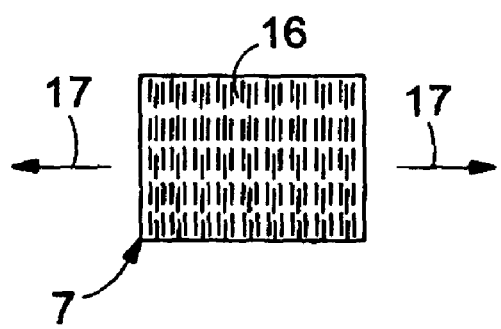
Figure 10:
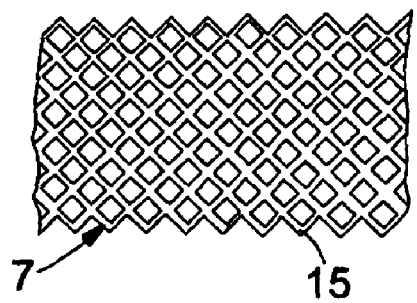
Figure 11:
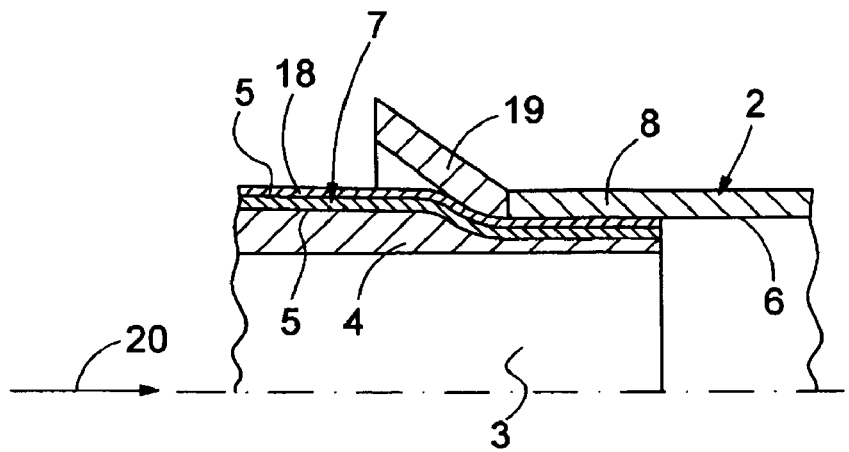
Figure 12:
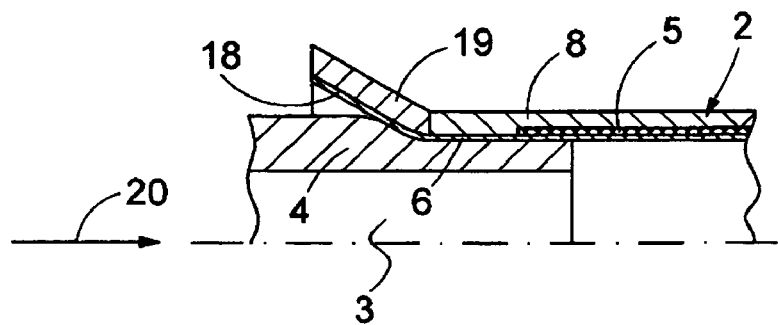
Figure 13:
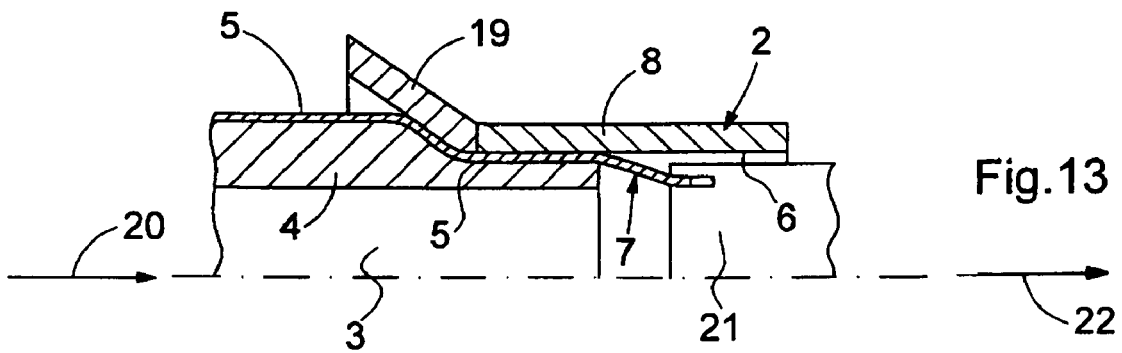

FIGS. 1 and 2 each show a greatly simplified longitudinal section through an exhaust gas treatment device in various embodiments, FIGS. 3 through 6 each show a greatly simplified half longitudinal section through exhaust gas treatment devices in other embodiments, FIGS. 7 and 8 show top views of bearing material in various embodiments, FIGS. 9 and 10 show top views of ribbed expanded metal in various manufacturing states, FIGS. 11 through 13 each show greatly simplified half longitudinal sections through the exhaust gas treatment device during its manufacture in various embodiments, FIG. 14 shows a view like that in FIG. 6 but in a different embodiment, FIG. 15 shows a view like that in FIG. 8 but in the embodiment according to FIG. 14, FIG. 16 shows a view like that in FIG. 14 but in another embodiment, FIG. 17 shows a view of a fixation insert of the embodiment according to FIG. 16, FIG. 18 shows a sectional view according to sectional lines XVIII in FIG. 17, FIG. 19 shows a side view of the fixation insert in the direction of viewing XIX in FIG. 17.

DETAILED DESCRIPTION OF PREFERRED EMBODIMENTS OF THE INVENTION

According to FIGS. 1 through 6, an inventive exhaust gas treatment device 1 which is suitable for installation in an exhaust system of an internal combustion engine, preferably installed in a motor vehicle, includes a housing 2, at least one exhaust gas treatment insert 3 arranged therein and a bearing material 4. The bearing material 4 sheaths the at least one exhaust gas treatment insert 3 on the circumference and is arranged radially between the respective exhaust gas treatment insert 3 and the housing 2 in the installed state. The bearing material 4 forms a support for the respective exhaust gas treatment insert 3 while at the same time forming axial fixation of same in the housing 2. To improve the axial fixation, at least one frictional structure 5 is provided according to this invention between the bearing material 4 and the housing 2. This at least one frictional structure 5 is designed so that it significantly increases the adhesive friction or adhesion between the bearing material 4 and the housing 2 in comparison with a comparable design without the at least one frictional structure 5. To do so, the at least one frictional structure 5 is designed, for example, so that it has a coefficient of friction with respect to the bearing material 4 greater than a coefficient of friction established between the bearing material 4 and the housing 2 when the respective frictional structure 5 is omitted, i.e., in the conventional design.

The design of the at least one frictional structure 5 is preferably targeted in such a way that it has a coefficient of friction in comparison with the bearing material 4 which is approximately the same as or greater than the coefficient of friction prevailing between the bearing material 4 and the at least one exhaust gas treatment insert 3. This ensures that when there is an increase in axial load and/or a reduced axial tension on the bearing material 4, the adhesion between the bearing material 4 and the housing 2 does not yield before the adhesion between the bearing material 4 and the at least one exhaust gas treatment insert 3. In concrete terms, the at least one frictional structure 5 may have a coefficient of friction in comparison with the bearing material 4 with a value of at least 0.4 or at least 0.5.

The housing 2 is preferably made of metal or sheet metal. Although in the embodiments shown here, only one single exhaust gas treatment insert is shown in each case, it is clear that in other embodiments, a plurality of exhaust gas treatment inserts 3 may be accommodated in housing 2, in particular in axial proximity. The respective exhaust gas treatment insert 3 may be designed as a monolith, for example, and preferably made of ceramic. A design of the respective exhaust gas treatment insert 3 as a catalytic converter element or as a particulate filter element is also conceivable.

The bearing material 4 is preferably a bearing mat in which the respective exhaust gas treatment insert 3 is wrapped. The bearing mat and/or the bearing material may be designed to be swelling or non-swelling. The bearing material 4 includes, for example, ceramic fibers into which thermally expanding mica may be incorporated to implement the swelling function. In addition, the bearing material 4 in the installed state is pressed and/or stretched radially with the at least one frictional contour 5 designed between the housing 2 and the bearing mat 4. Due to the radial stretching, a normal force is created between the bearing material 4 and the housing 2, the size of which is a deciding factor for the adhesive friction between the bearing material 4 and the housing 2.

FIG. 1 shows an embodiment in which the respective frictional structure 5 is integrated into the inside 6 of the housing 2 which faces the bearing mat 4. The respective frictional structure 5 does not form a separate component but instead is integrally designed on the inside 6. For example, such an integrated frictional structure 5 can be produced by roughening and/or superficially cutting and/or ribbing and/or serrating the inside 6. To do so, a regular pattern or stochastic roughness is suggested as a method of accomplishing this. The respective frictional structures 5 may be designed to be linear and/or point shaped. Likewise, two-dimensional frictional structures 5 are also possible. In particular, a single frictional structure 5 may be provided, extending cylindrically over an axial section of the inside 6, preferably over the entire axial length of the bearing mat 4, as in the present case.

FIGS. 2 through 6 show other embodiments in which the at least one frictional structure 5 is formed by at least one frictional insert 7 or is designed on at least one frictional insert 7. Such a frictional insert 7 forms a separate component with respect to the bearing mat 4, with respect to the at least one exhaust gas treatment insert 3 and with respect to the housing 2, said separate component being additionally installed in the exhaust gas treatment device 1. It is clear here that the at least one separate frictional insert 7 in the embodiments illustrated in FIGS. 2 through 6 may essentially be combined with the at least one integrated frictional structure 5, as shown in FIG. 1.

FIGS. 2 through 5 each illustrate embodiments in which only a single frictional insert 7 is provided. In contrast with that, FIG. 6 shows an embodiment having a plurality of frictional inserts 7.

The respective frictional insert 7 may have said frictional structure 5 exclusively on its inside facing the bearing material 4 or exclusively on its outside facing the housing 2 or on both its inside and its outside. In FIG. 2, the frictional structure 5 is designed on both the outside of the frictional insert 7 and on the inside of the frictional insert 7. In contrast with that, in the embodiments according to FIGS. 3 through 6, the frictional structure on the respective frictional insert 7 is designed at least on the inside of the respective frictional insert 7. However, this does not explicitly preclude a frictional structure 5 on the outside of the respective frictional insert 7. Essentially the frictional structures 5 designed on the inside of the respective frictional insert 7 are different from the frictional structures 5 designed on the outsides of the respective frictional inserts 7, e.g., with regard to roughness or coefficient of friction.

In the embodiment according to FIG. 1, the respective frictional structure 5 is arranged fixedly on the housing 2 due to its integration into the inside 6. In the embodiment according to FIG. 2, the respective frictional structure 5 of the respective frictional insert 7 facing the housing 2 is designed so that a high coefficient of friction develops accordingly between the frictional insert 7 and the housing 2, for example. In this way, adequate adhesion can also be achieved between the frictional insert 7 and the housing 2. Such a design can be implemented, for example, when the housing 2 is manufactured in the half-shell design. The respective frictional insert 7 can then be inserted especially easily together with the exhaust gas treatment insert 3 wrapped with the bearing material 4 into the one half-shell of the housing, which can then be completed with the other half-shell of the housing to form the housing 2.

However, in the manufacture of exhaust gas treatment devices 1, a method described in greater detail below with reference to FIGS. 11 through 13 is widely used; in this method, the exhaust gas treatment insert 3 wrapped with the bearing material 4 is inserted axially into a jacket 8 of the housing 2, which is closed on the circumference. Frictional structures 5 can interfere with the axial introduction of the wrapped insert 3. To reduce these problems, it is fundamentally possible to design the respective frictional structure 5 on the outside of the respective frictional insert 7 facing the housing 2 so that a comparatively low coefficient of friction is established between the housing 2 and the frictional insert 7. It is likewise fundamentally possible to provide no special frictional structures on the outside of the frictional inserts 7.

For axial fixation of the respective frictional insert 7 in the housing 2, the respective frictional insert 7 may be attached to the housing 2 through special measures.

According to FIGS. 3 through 6, the respective frictional insert 7 may be of such dimensions, for example, that it protrudes axially beyond the bearing material 4 and/or beyond the at least one exhaust gas treatment insert 3. According to FIG. 3, the respective frictional insert 7 may protrude axially into an annular space 9 formed between the housing jacket 8 and a housing funnel 10, preferably an inlet funnel. Said housing funnel 10 is mounted on the housing jacket 8 by means of a peripheral weld 11. In the embodiment illustrated here, the respective frictional insert 7 protrudes into the annular space 9, so that said weld 11 at the same time also attaches the respective frictional insert 7 to the housing 2.

In the embodiment illustrated in FIG. 4, the respective frictional insert 7 is attached to the housing 2 by an additional weld in the form of spot welds 12. FIG. 4 shows a single frictional insert 7 which surrounds the bearing material 4 on the circumference and is attached to the housing 2 at several spot welds 12. In contrast with that, FIG. 6 shows an embodiment having multiple frictional inserts 7 which are distributed around the circumference, each being attached to the housing 2 with a separate spot weld 12.

According to FIG. 5, an additional component, namely a ring body 13 with which the respective frictional insert 7 is mounted on the housing 2, may be provided for attaching the respective frictional insert 7 to the housing 2. To this end, said ring body 13 is brought into contact with the inside against the respective frictional insert 7 and is attached to the housing 2 with a peripheral weld 14. Through this weld 14, the respective frictional insert 7 is at the same time attached to the ring body 13 and/or to the housing 2. Such an additional ring body 13 is expedient in particular when the respective frictional insert 7 has a comparatively small wall thickness, which is not suitable for spot welding, for example. In addition, the ring body 13 simplifies the axial fixation of multiple frictional inserts 7 to which it is assigned jointly. By spot welding the ring body 13 to the housing 2, all the individual frictional inserts 7 are then attached to the housing 2 at the same time. The ring body 13 is arranged at an axial offset with respect to the at least one exhaust gas treatment insert 3 in the housing 2 according to FIG. 5, whereby the ring body 13 may also serve as an axial stop for the bearing material 4, for example.

According to FIGS. 7 and 8, it is fundamentally possible to produce the bearing material 4 in the form of sheets so that it can be wound up onto the respective exhaust gas treatment insert 3 especially easily. It may be expedient to arrange the frictional inserts 7 on the bearing material 4 as part of the finishing of the bearing material 4. For example, several strip-like frictional inserts 7 are arranged side-by-side on the bearing material 4 in FIGS. 7 and 8. In the embodiment according to FIG. 7, the frictional inserts 7 extend within the axial length of the bearing material 4, which here corresponds to the web width of the bearing material web. In contrast with that, in the variant according to FIG. 8, the frictional inserts 7 extend axially over the bearing material 4. In the installed state, this leads to the embodiment according to FIG. 6.

The respective frictional insert 7 expediently is made of a heat-resistant and especially scale-resistant material, e.g., stainless steel. According to FIGS. 9 and 10, the respective frictional insert may be formed by ribbed expanded metal 15 according to a preferred embodiment. Such ribbed expanded metal 15 can be manufactured, for example, by providing a sheet metal plate 16 with a plurality of parallel slots according to FIG. 9. Then the sheet 16 is stretched across the slots according to arrows 17 so that the slots are widened to form diamond-shaped openings according to FIG. 10. The metal plate material then forms ribs that surround openings and are also raised out of the plane of the metal plate due to the stretching. These ribs have comparatively sharp edges, so that the expanded metal 15 makes it possible to achieve a very high coefficient of friction, at least on one side.

As already explained above, the axial insertion of the exhaust gas treatment insert 3 sheathed with the bearing material 4 into the housing 2 may lead to problems when the respective frictional structure 5 increases the friction between the housing 2 and the unit being inserted in accordance with its function. This friction may lead to damage on the one hand, but on the other hand, the respective frictional structure 5 may be dulled with regard to its function.

To relieve these problems, according to a preferred manufacturing method, it is proposed that an assembly aid sheathing 18 be used in such a way that it is situated radially between the respective frictional structure 5 and the housing 2 and/or between the respective frictional structure 5 and the bearing material 4 in the axial insertion of the respective exhaust gas treatment insert 3 into the housing 2. The assembly aid sheathing 18 is characterized by a low coefficient of friction and thereby deactivates the respective frictional structure 5. This allows the insertion of the unit to be introduced into the housing 2 with reduced friction, which greatly simplifies production. The assembly aid sheathing 18 is preferably designed so that it volatilizes at the latest during operation of the exhaust gas treatment device 1. For example, the assembly aid sheathing 18 may be made of a suitable plastic. Additionally or alternatively, the assembly aid sheathing 18 may be designed so that it can ensure the deactivation of the respective frictional structure 5 only for the assembly operation and then yields due to flow processes or creep processes due to the prevailing radial tension between the bearing material 4 and the housing 2, thereby reactivating the respective frictional structure 5.

According to FIGS. 11 through 13, the at least one exhaust gas treatment insert 3 sheathed with the bearing material 4 is inserted axially by means of an insertion funnel 19 into the housing jacket 8. In this process, the bearing material 4 is compressed radially, e.g., by approximately 50% of its thickness, to achieve the desired radial tension in the inserted state, i.e., the desired radial prestress between the bearing material 4 and the housing 2.

In the embodiment according to FIG. 11, the bearing material 4 is provided with at least one frictional insert 7, which is in turn provided with the frictional structure 5 on both its inside and its outside. The frictional structure 5 on the outside is deactivated with the help of the assembly aid sheathing 18. To this end, the assembly aid sheathing 18 is applied on the outside to the bearing material 4 which is provided with the at least one frictional insert 7. The insertion or introduction of the unit formed by the exhaust gas treatment insert 3, the bearing material 4, the frictional insert 7 and the assembly aid sheathing 18, as indicated by the arrow 20, is thereby simplified.

In the embodiment illustrated in FIG. 12, the respective frictional structure 5 is integrated into the inside wall 6 of the housing jacket 8 according to the embodiment in FIG. 1. The assembly aid sheathing 18 here is preferably arranged in the housing 2, so that the respective frictional structure 5 is deactivated. The assembly aid sheathing 18 preferably extends along the insertion funnel 19 to thereby facilitate the insertion of the insert 3 sheathed with the bearing material 4. The assembly insertion sheathing 18 may be attached to the insertion funnel 19, for example.

FIG. 13 shows an embodiment wherein the exhaust gas treatment insert 3 sheathed with the bearing material 4 has been pulled into the housing jacket 8 here by the at least one frictional insert 7. A corresponding pulling tool is labeled as 21, while the tensile force applied is represented by the arrow 22. The insertion of the insert 3 may be supported by compressive force.

To prevent axial slippage of the at least one frictional insert 7 in relation to the bearing material 4 in axial insertion of the unit including the exhaust gas treatment insert 3, the bearing material 4 and the at least one frictional insert 7 into the housing jacket 8, the at least one frictional insert 7 may be attached to the exhaust gas treatment insert 3. For example, at least one suitable fixation band may be provided, extending over the front axial end face in the insertion direction and connected at its ends to at least one frictional insert 7. Likewise, strip-like frictional inserts 7 may be arranged in such a way that they extend over the advancing end face. Multiple such wall-shaped frictional inserts 7 may intersect on the end face.

It is possible to fixedly tie the respective frictional insert 7 into the bearing material 4. For example the respective frictional insert 7 may have passages, e.g., in an embodiment as a perforated plate, and may be tied into them in a more or less form-fitting manner already at the time of manufacture of the bearing material 4. If a frictional structure 5 is essentially no longer necessary due to the frictional insert 7 being tied into the bearing material 4 between the frictional insert 7 and the bearing material 4, the frictional structure may therefore be omitted. In addition, a frictional structure 5 may also be omitted between the frictional insert 7 and the housing if the respective frictional insert 7 is axially secured on the housing 2 in a suitable manner. If no frictional structure 5 is needed on the frictional insert 7 on either the inside or outside, instead of the frictional insert 7, a modified insert or fixation insert which does not have any special frictional structure 5 may then also be used. This embodiment constitutes an alternative approach toward improving the axial fixation of the bearing material 4 in the housing 2 that operates without frictional structures 5. If, to implement this alternative approach, the respective insert or fixation insert is fixedly tied into the bearing material 4, then this solution is possibly associated with an increased complexity.

Exemplary embodiments of exhaust gas treatment devices 1 which do not use frictional structures 5 or frictional inserts 7 are described in greater detail below with reference to FIGS. 14 through 19 and instead each has one of the aforementioned fixation inserts 24. According to FIG. 14, a plurality of such fixation inserts 24 may be arranged so they are distributed around the circumference and are arranged radially between the bearing material 4 and the housing 2. The fixation inserts 24 are attached to the housing 2 by spot welds 12, for example. The fixation inserts 24 illustrated in FIG. 14 form an axial fixation for the bearing material 4. To this extent the bearing material 4 is attached axially to the housing 2 via the fixation inserts 24. This axial fixation is achieved here by the fact that the respective fixation insert 24 has an edge 25 that protrudes radially inward on its outflow end and is angle inward, for example. Said edge 25 extends beyond the bearing material 4 on the outflow end. In this way, the fixation insert 24 acts as a tensile anchor for the bearing material 4.

According to FIG. 15, these fixation inserts 24 may already be attached to the bearing material 4 on fabrication thereof, thereby simplifying the assembly of the exhaust gas treatment device 1. It can be seen that in this embodiment the fixation inserts 24 protrude beyond the bearing material 4 in the axial direction, i.e., across the longitudinal direction of the strip-shaped bearing material 4, namely at the end area provided for producing the spot welds 12 on the one hand and at the edge 25 on the other hand.

According to FIG. 16, the fixation inserts 24 in another embodiment may also be attached to the bearing material 4 by the fact that they have a toothed structure 26 on the side facing the bearing material 4, said toothed structure engaging in the bearing material 4 and thereby penetrating into the bearing material 4. Due to the form-fitting engagement of the toothed structure 26 in the bearing material 4, the bearing material is adequately secured at least axially on the respective fixation insert 24. Such a toothed structure 26 is many times greater in extent than the roughness of the frictional structure 5 of the embodiments described above.

According to FIGS. 17 through 19, the respective fixation insert 24 may have a U-shaped section 27 in the area assigned to the bearing material 4, for example. The toothed structure 26 may be formed on the opposing legs of the U-shaped section 27. The individual teeth or prongs may be produced by cutting out, knocking out and/or bending. A fixation insert 24 designed in this way can be manufactured comparatively inexpensively.

In an alternative embodiment, the fixation insert 24 may also have a nail structure instead of a toothed structure 26, said nail structure being characterized by a plurality of nails protruding radially inward. These nails then engage accordingly in the bearing material 4, thereby forming an adequate axial fixation of the bearing material 4 on the respective fixation insert 24.

The features explained above for fixation of the respective frictional insert 7 on the housing 2 can also be implemented accordingly for the respective fixation inserts 24. Likewise, the process features described above for the frictional inserts 7 may also be executed accordingly for the embodiment having the fixation inserts 24.

FIGS. 1 through 6, 11 through 14 and 16 show a longitudinal central axis labeled as 23.

An exhaust gas treatment device 1 for an exhaust system of an internal combustion engine, in particular in a motor vehicle, includes according to a first embodiment of the invention at least a housing 2, at least one exhaust gas treatment insert 3 which is arranged in the housing 2 and is sheathed by bearing material 4 on the circumference, whereby at least one frictional structure 5 is provided between the bearing material 4 and the housing 2. According to a second embodiment of the invention the exhaust treatment device 1 includes at least a housing 2, at least one exhaust gas treatment insert 3 arranged in the housing 2 and sheathed on the circumference by bearing material 4, whereby at least one fixation insert 24 is arranged between the bearing material 4 and the housing 2 and is mounted on the housing 2 and attached at least axially to the bearing material 4.

Embodiments of the invention according to the aforementioned first alternative could include at least one of the following features:

the at least one frictional structure 5 has a coefficient of friction with respect to the bearing material 4 that is approximately equal to or greater than the coefficient of friction between the bearing material 4 and the at least one exhaust gas treatment insert 3;

the at least one frictional structure 5 has a coefficient of friction of at least 0.4 or at least 0.5 with respect to the bearing material 4;

the at least one frictional structure 5 has a coefficient of friction with respect to the bearing material 4 that is greater than the coefficient of friction established between the bearing material 4 and the housing 2 in the absence of a frictional structure 5 or in the absence of frictional structures 5; the at least one frictional structure 5 is integrated into the inside 6 of the housing 2 facing the bearing material 4;

the at least one frictional structure 5 is formed by roughening and/or superficially cutting and/or ribbing and/or serrating the inside 6 of the housing 2 facing the bearing material 4;

the at least one frictional structure 6 is designed to be in the form of a flat surface and/or a line and/or a point;

the at least one frictional structure 5 formed by at least one frictional insert 7 or is formed on at least one frictional insert 7, whereby the respective frictional insert 7 is a separate part with respect to the bearing material 4, the exhaust gas treatment insert 3 and the housing 2;

the respective frictional insert 7 has the frictional structure 5 with respect to the bearing material 4 and/or with respect to the housing 2;

the respective frictional insert 7 is formed by ribbed expanded metal 15.

Embodiments of the invention according to the aforementioned second alternative could include at least one of the following features:

the respective fixation insert 24 is designed as a tension anchor;

the respective fixation insert 24 engages behind a downstream end of the bearing material 4;

the respective fixation insert 24 has a toothed structure 26 or a nail structure engaging in the bearing material 4;

the respective fixation insert 24 has a U-shaped section 27 with the toothed structure 26 formed on its legs.

Further embodiments of the aforementioned embodiments or of the invention according to the aforementioned first and second alternative, respectively, could comprise at least one of the following features:

the frictional insert 7 or the fixation insert 24, respectively, is attached to the housing 2;

the frictional insert 7 or the fixation insert 24, respectively, is fixedly tied into the bearing material 4;

the frictional insert 7 or the fixation insert 24, respectively, is made of a heat-resistant and/or scale-resistant material;

several frictional inserts 7 or fixation inserts 24, respectively, are arranged in distribution around the circumference;

a single frictional insert 7 or fixation insert 24, respectively, sheaths the bearing material 4 on the circumference;

the at least one frictional insert 7 or fixation insert 24, respectively, protrudes axially beyond the at least one exhaust gas treatment insert 3;

the at least one frictional insert 7 or fixation insert 24, respectively, protrudes axially into an annular space 9 between a housing jacket 8 and a housing funnel 10;

the at least one frictional insert 7 or fixation insert 24, respectively, is attached to the housing 2 by a weld 11 which at the same time attaches the housing funnel 10 to the housing jacket 8;

the frictional insert 7 or the fixation insert 24, respectively, is attached to the housing 2 with a ring body 13;

the ring body 13 is arranged with an axial offset in the housing 2 with respect to the at least one exhaust gas treatment insert 3;

the bearing material 4 is a swelling or non-swelling bearing mat;

the at least one exhaust gas treatment insert 3 is a monolith;

the at least one exhaust gas treatment insert 3 is made of ceramic;

the at least one exhaust gas treatment insert 3 is designed as a catalytic converter element or as a particulate filter element;

the bearing material 4 is compressed radially with at least one frictional contour 5 arranged between the housing 2 and the bearing material 4.

A method according to a first alternative embodiment of the invention for manufacturing an exhaust gas treatment device 1 for an exhaust system of an internal combustion engine, in particular in a motor vehicle, includes at least the steps of sheathing at least one exhaust gas treatment insert 3 with a bearing material 4 on the circumference, and introducing the at least one exhaust gas treatment insert 3 sheathed with the bearing material 4 into a housing 2 which is provided with at least one frictional structure 5 on its inside 6.

According to a second alternative embodiment of the invention a method for manufacturing an exhaust gas treatment device 1 for an exhaust system of an internal combustion engine, in particular in a motor vehicle, includes at least the steps of sheathing at least one exhaust gas treatment insert 3 with the bearing material 4 on the circumference, and introducing the at least one exhaust gas treatment insert 3 sheathed with the bearing material 4 into the housing 2 together with the at least one insert 7 and/or 24 such that the at least one insert 7 and/or 24 is then arranged radially between the bearing material 4 and the housing 2.

Embodiments of the aforementioned alternatives of the method according to the invention could include at least one of the following features/steps:

the respective insert is a fixation insert 24 or a frictional insert 7;

the at least one insert 7 and/or 24 is already tied into the bearing material 4 at the time of sheathing of the at least one exhaust gas treatment insert 3;

the at least one exhaust gas treatment insert 3 sheathed with the bearing material 4 is sheathed on the circumference before introducing it into the housing 2 with the insert 7 and/or 24;

the at least one insert 7 and/or 24 is attached to at least one exhaust gas treatment insert 3 at least for the insertion into the housing 2;

the at least one insert 7 and/or 24 is attached to the housing 2 after being inserted into same;

the at least one exhaust gas treatment insert 3 sheathed with bearing material 4 is pulled axially into the housing 2 by at least one insert 7 and/or 24 for insertion into the housing 2;

before inserting the at least one exhaust gas treatment insert 3 sheathed with the bearing material 4 into the housing 2, an assembly aid sheathing 18 is arranged in such a way that it is situated radially between the bearing material 4 and the at least one frictional structure 5 or radially between the at least one insert 7 and/or 24 and the housing 2 on insertion of the at least one exhaust gas treatment insert 3 sheathed with the bearing material 4 into the housing 2;

the assembly aid sheathing 18 is selected so that it volatilizes at the latest during operation of the exhaust gas treatment device 1.

The invention claimed is:

1. An exhaust gas treatment device for an exhaust system of an internal combustion engine, comprising:
   a housing,
   at least one exhaust gas treatment insert which is arranged in the housing and is sheathed by bearing material on a circumference thereof,
   wherein at least one frictional structure is provided between the bearing material and the housing,
   wherein the at least one frictional structure is formed by at least one frictional insert,
   wherein the at least one frictional insert protrudes axially beyond the at least one exhaust gas treatment insert and attaches with the housing.

2. The exhaust gas treatment device according to claim 1, wherein the frictional insert has the frictional structure with respect to at least one of the bearing material and the housing.

3. The exhaust gas treatment device according to claim 1, wherein the at least one frictional insert attaches with the housing by means of a weld.

4. An exhaust gas treatment device for an exhaust gas system of an internal combustion engine, comprising:
   a housing,
   at least one exhaust gas treatment insert arranged in the housing and sheathed on a circumference thereof by bearing material, and
   at least one fixation insert arranged between the bearing material and the housing, mounted on the housing and attached at least axially to the bearing material,
   wherein the at least one fixation insert protrudes axially beyond the at least one exhaust gas treatment insert and mounts on the housing,
   wherein the fixation insert is mounted on the housing with a ring body.

5. The exhaust gas treatment device according to claim 4, wherein the fixation insert is a tension anchor.

6. The exhaust gas treatment device according to claim 4, wherein the fixation insert is attached to the bearing material behind a downstream end of the bearing material.

7. The exhaust gas treatment device according to claim 4, wherein the fixation insert has a toothed structure engaging in the bearing material.

8. The exhaust gas treatment device according to claim 4, wherein the fixation insert has a U-shaped section, and a toothed structure formed on the legs of the U-shaped structure.

9. The exhaust gas treatment device according to claim 4, wherein the fixation insert is fixedly tied into the bearing material.

10. The exhaust gas treatment device according to claim 4, wherein the fixation insert comprises a heat-resistant material.

11. The exhaust gas treatment device according to claim 4, wherein a plurality of fixation inserts are arranged around the circumference of the bearing material.

12. The exhaust gas treatment device according to claim 4, wherein the at least one fixation insert is a single insert sheathing the bearing material on a circumference of the bearing material.

13. The exhaust gas treatment device according to claim 4, wherein the housing has a housing jacket and a housing funnel, and an annular space defined therebetween, and the at least one fixation insert protrudes axially into said annular space.

14. The exhaust gas treatment device according to claim 13, wherein the at least one fixation insert is attached to the housing by a weld which also attaches the housing funnel to the housing jacket.

15. The exhaust gas treatment device according to claim 4, wherein the ring body is arranged with an axial offset in the housing with respect to the at least one exhaust gas treatment insert.

* * * * *